US012782279B2

(12) United States Patent
Yamashita

(10) Patent No.: US 12,782,279 B2
(45) Date of Patent: Nov. 3, 2026

(54) SURFACE SCATTER TURBIDIMETER AND TURBIDITY MEASUREMENT METHOD

(71) Applicant: Yokogawa Electric Corporation, Tokyo (JP)

(72) Inventor: Nanami Yamashita, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 19/077,930

(22) Filed: Mar. 12, 2025

(65) Prior Publication Data

US 2025/0290852 A1 Sep. 18, 2025

(30) Foreign Application Priority Data

Mar. 18, 2024 (JP) ................................ 2024-042586

(51) Int. Cl.
*G01N 21/53* (2006.01)
*G01N 21/51* (2006.01)

(52) U.S. Cl.
CPC ............. *G01N 21/53* (2013.01); *G01N 21/51* (2013.01)

(58) Field of Classification Search
CPC ................... G01N 21/53; G01N 21/51; G01N 2021/4757; G01N 2201/0642; G01N 21/47; G01N 21/01; G01N 21/49; G01N 2021/0112
USPC .......................................................... 356/337
See application file for complete search history.

(56) References Cited

U.S. PATENT DOCUMENTS

2023/0137328 A1* 5/2023 Kawano ................. C12M 41/26 435/167
2023/0304930 A1 9/2023 Kyakuno et al.

FOREIGN PATENT DOCUMENTS

| | | | |
|---|---|---|---|
| EP | 1241464 | A1 | 9/2002 |
| JP | H07-041454 | U | 7/1995 |
| JP | 2006300858 | A | 11/2006 |
| JP | 2023144868 | A | 10/2023 |

OTHER PUBLICATIONS

Japanese Office Action (JPOA) mailed on Sep. 1, 2026 for Japanese patent application No. 2024-042586 and its English machine translation.

* cited by examiner

*Primary Examiner* — Md M Rahman
(74) *Attorney, Agent, or Firm* — RANKIN, HILL & CLARK LLP

(57) ABSTRACT

A measurement tank stores a liquid to be measured. A light source emits light to a liquid surface of the liquid to be measured stored in the measurement tank. A light receiving element receives scattered light generated at the measurement tank from the light from the light source. A change mechanism changes a relative position in relation to a component horizontal to the liquid surface in a direction of travel of the light, the relative position being between: an irradiation position where the light from the light source is emitted to on the liquid surface; and the light receiving element. A turbidity value calculation unit calculates a turbidity value of the liquid to be measured, on the basis of the scattered light received by the light receiving element.

10 Claims, 7 Drawing Sheets

FIG.4

101

| HEIGHT OF MEASUREMENT TANK | INTERSECTION POINT BETWEEN OPTICAL AXIS AND LIQUID SURFACE | LINEARITY | |
|---|---|---|---|
| | | HIGH TURBIDITY | LOW TURBIDITY |
| RAISED | MOVED IN NEGATIVE DIRECTION ALONG X-AXIS | REDUCED | IMPROVED |
| LOWERED | MOVED IN POSITIVE DIRECTION ALONG X-AXIS | IMPROVED | REDUCED |

FIG.5

200

| TURBIDITY (LOW ↑ … ↓ HIGH) | TURBIDITY THRESHOLD | Z-COORDINATE | HEIGHT (HIGH ↑ … ↓ LOW) |
|---|---|---|---|
| LOW | #1 | Z(3) | HIGH |
| | #2 | Z(2) | |
| | #3 | Z(1) | |
| TURBID-ITY | - | REFERENCE POSITION | HEIGHT |
| | ##1 | Z(-1) | |
| | ##2 | Z(-2) | |
| HIGH | ##3 | Z(-3) | LOW |

SURFACE SCATTER TURBIDIMETER AND TURBIDITY MEASUREMENT METHOD

CROSS-REFERENCE TO RELATED APPLICATION

The present application claims priority to and incorporates by reference the entire contents of Japanese Patent Application No. 2024-042586 filed in Japan on Mar. 18, 2024.

FIELD

The present invention relates to a surface scatter turbidimeter and a turbidity measurement method.

BACKGROUND

Turbidimeters for optically measuring turbidity of liquids to be measured, such as liquids from water filtering plants and industrial water, have been known. Turbidity is an index indicating cloudiness of a liquid. Measurement methods used for turbidimeters are classified into, for example, transmitted light methods, scattered light methods, transmitted and scattered light methods, surface scattered light methods, and integrating sphere methods.

Of these measurement methods, surface scattered light methods are measurement methods that utilize a proportional relation between intensity of scattered light and concentration of suspended matter in a liquid. In a surface scattered light method, light emitted from a light source is reflected by suspended matter in a liquid to be measured stored in a measurement tank, scattered light is thereby generated, the scattered light is received by a light receiving element and converted into an electric signal corresponding to intensity of the light, and turbidity corresponding to the electric signal is calculated.

A turbidimeter that calculates turbidity by comparative calibration using scattered light beams from two light beams having different wavelengths has been proposed as a surface scattered light turbidimeter (Japanese Laid-open Patent Publication No. 2023-144868). A turbidimeter that measures turbidity using forward scattered light has also been proposed (Japanese Laid-open Patent Publication No. 2006-300858).

However, a surface scatter turbidimeter that measures turbidity by a conventional surface scattered light method has fixed positional relations between its light source, measurement tank, and light receiving element, and turbidity is found by emission of light from the light source to the same position on a liquid to be measured stored in the measurement tank. Because of the fixed positional relations between the light source, measurement tank, and light receiving element, adjusting optical path lengths in the liquid has been difficult and measuring turbidity precisely according to a state of the liquid to be measured has thus been difficult.

As to such difficulty, a turbidimeter using two light beams having different wavelengths or a turbidimeter that measures turbidity using forward scattered light also has fixed positional relations between its light source, measurement tank, and light receiving element, and precisely measuring turbidity using this turbidimeter according to a state of a liquid to be measured is thus also difficult.

According to an aspect of the present invention, precision of turbidity measurement is improved.

SUMMARY

It is an object of the present invention to at least partially solve the problems in the conventional technology.

According to an aspect of an embodiment, a surface scatter turbidimeter includes, a measurement tank to store a liquid to be measured, a light source that emits light to a liquid surface of the liquid to be measured stored in the measurement tank, a light receiving element that receives scattered light generated at the measurement tank from the light from the light source, a change mechanism that changes a relative position between an irradiation position that the light from the light source is emitted to on the liquid surface and the light receiving element, the relative position being in relation to a component horizontal to the liquid surface in a direction of travel of the light, and a turbidity value calculation unit that calculates a turbidity value of the liquid to be measured on the basis of the scattered light received by the light receiving element.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating a relation between height of a measurement tank and linearity;

FIG. 5 is a diagram illustrating correspondence between plural turbidity thresholds and positions along a Z-axis;

DETAILED DESCRIPTION OF THE PREFERRED EMBODIMENTS

Embodiments of a surface scatter turbidimeter and a turbidity measurement method will hereinafter be described while reference is made to the drawings. The same reference sign will be assigned to elements that are the same and redundant description thereof will be omitted as appropriate. The embodiments may be combined as appropriate so long as no contradictions arise from the combination.

First Embodiment

Overall Configuration

Figure 1:
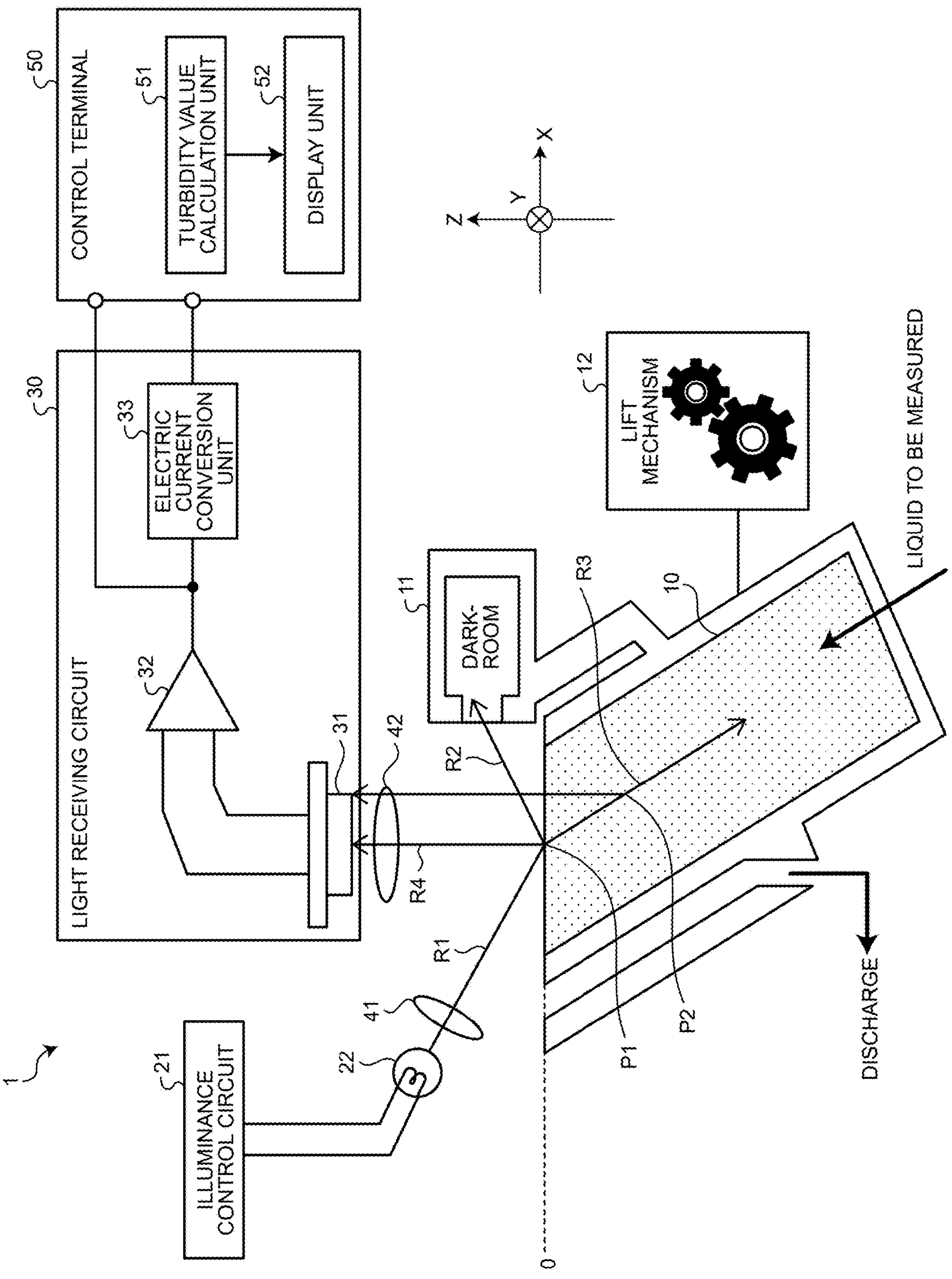
FIG. 1 is a diagram of a configuration of a turbidimeter according to a first embodiment.

FIG. 1 is a diagram illustrating a configuration of a turbidimeter according to a first embodiment. A turbidimeter 1 has a measurement tank 10, an illuminance control circuit 21, a light source 22, a light receiving circuit 30, lenses 41 and 42, and a control terminal 50.

The light source 22 according to the first embodiment emits light in a specific direction toward a liquid surface of a liquid to be measured stored in the measurement tank 10.

The direction of the light from the light source 22 according to the first embodiment has been fixed. The light emitted from the light source 22 is condensed by the lens 41 and travels to the liquid surface of the liquid to be measured stored in the measurement tank 10.

The light emitted from the light source 22 and condensed by the lens 41 is emitted to the liquid surface, as indicated by a route R1 in FIG. 1, diagonally at a specific angle to the liquid surface constantly maintained in the measurement tank 10. The light source 22 is, for example, a tungsten lamp.

Due to influence of deterioration of and power supply voltage fluctuations in the light source 22, illuminance of the light source 22 varies. The illuminance control circuit 21 thus controls the illuminance of the light source 22 in order to remove the influence of the deterioration of and power supply voltage fluctuations in the light source 22. The illuminance control circuit 21 thereby keeps illuminance of the light emitted from the light source 22 constant.

The light receiving circuit 30 is a circuit that converts scattered light from the liquid to be measured, into electric current, and outputs an electric current signal proportional to the scattered light, to the control terminal 50. The light receiving circuit 30 has a light receiving element 31, an amplifier 32, and an electric current conversion unit 33.

The light receiving element 31 is, for example, a silicon photodiode. The light receiving element 31 receives incidence of the scattered light from the liquid to be measured, the scattered light having been condensed by the lens 42. The light receiving element 31 detects the scattered light received. The light receiving element 31 outputs an optical signal resulting from the light detected, to the amplifier 32.

The amplifier 32 receives input of the optical signal from the light receiving element 31. The amplifier 32 then amplifies intensity of the optical signal. Thereafter, the amplifier 32 outputs the optical signal of the scattered light, the optical signal having been amplified in intensity, to the control terminal 50 and the electric current conversion unit 33.

The electric current conversion unit 33 receives input of the optical signal of the scattered light from the amplifier 32, the optical signal having been amplified in intensity. The electric current conversion unit 33 converts the optical signal into an electric current signal. Thereafter, the electric current conversion unit 33 outputs, as an electric current signal indicating the intensity of the scattered light, the electric current signal converted from the optical signal of the scattered light, to the control terminal 50.

The measurement tank 10 is equipped with a darkroom 11 and a lift mechanism 12. A liquid to be measured adjusted to be at a constant pressure continuously flows into the measurement tank 10. The measurement tank 10 lets the liquid to be measured that has flown into the measurement tank 10 overflow to maintain a constant liquid level. The measurement tank 10 discharges the liquid to be measured that has overflown, outside the measurement tank 10.

A coordinate system is set for the measurement tank 10. An axis representing a component horizontal to a liquid surface in a direction of travel of light emitted from the light source 22 will be referred to as an X-axis. A direction of the component horizontal to the liquid surface in the direction of travel of the light emitted from the light source 22 will herein be referred to as a positive direction along the X-axis. A normal line to the liquid surface will be referred to as a Z-axis. A direction in which light is reflected from the liquid surface, that is, a direction toward the light receiving element 31 from the liquid surface will be referred to as a positive direction along the Z-axis. A direction orthogonal to both the X-axis and the Z-axis will be referred to as a Y-axis. That is, the Y-axis is an axis normal to a plane formed by the route R1 that the light emitted from the light source 22 travels along and the X-axis. A direction into a plane of paper of FIG. 1 will herein be referred to as a positive direction along the Y-axis.

Part of light emitted from the light source 22 is reflected, as represented by a route R2, at a position P1 that is an intersection point between the light and the liquid surface, and other part of the light goes into the liquid as represented by a route R3. FIG. 1 illustrates a case where the position P1, which is a position where the light is reflected on the liquid surface, coincides with the center of the light receiving element 31 in a Z-direction, that is, a case where X and Y coordinates of the position P1 and X and Y coordinates of the center of the light receiving element 31 coincide with each other. A Z-coordinate of the measurement tank 10 is 0 in a case where the position P1 illustrated in FIG. 1 and the center of the light receiving element 31 coincide with each other in the Z direction, the position P1 being the intersection point between the light emitted from the light source 22 and the liquid surface. The state in FIG. 1 where the Z-coordinate of the measurement tank 10 is 0 will hereinafter be referred to as the "reference state".

Reflected light reflected by the liquid surface travels to, is absorbed, and vanishes in the darkroom 11. Transmitted light that has entered the liquid is also absorbed by and vanishes in the liquid to be measured. Influence by the reflected light and transmitted light on turbidity measurement is thereby minimized.

However, light that has entered the liquid from the liquid surface generates scattered light beams heading in the positive direction along the Z-axis from the liquid surface due to suspended matter (a turbidity component) in the liquid to be measured at the liquid surface and in the liquid. As represented by a route R4, the scattered light beams are emitted to positions opposed to the liquid surface, that is, to the light receiving element 31 by being condensed by the lens 42 provided in the positive direction along the Z-axis from the liquid surface.

The larger the number of positions included in an area of the liquid surface is, the larger the amount of light incident on the light receiving element 31 is, the positions being where scattered light beams are generated, the area overlapping the light receiving element 31 in a direction along the Z-axis. That is, in a case where the whole intensity of the scattered light beams is to be considered, the size of the area where the positions that the scattered light beams are generated overlap the light receiving element 31 in the Z-direction is important. For simplification of description, FIG. 1 illustrates the scattered light beams that travel in a positive Z direction from the positions where the scattered light beams are generated. For example, in the reference state, scattered light generated at the position P1 on the liquid surface heads to the center of the light receiving element 31. A position P2 where scattered light heading to an end portion of the light receiving element 31 is generated is the deepest position where scattered light is generated in the reference state, the end portion being in a positive X direction. The area of the liquid surface will hereinafter be referred to as the "range visible from the light receiving element 31", the area overlapping the light receiving element 31 in the direction along the Z-axis. In actuality, scattered light beams head in different directions, and any scattered light beams heading to the lens 42 are condensed and emitted to the light receiving element 31.

The lift mechanism 12 is a mechanism that moves the measurement tank 10 along the Z-axis. The lift mechanism 12 is capable of moving the measurement tank 10 in both the positive direction along the Z-axis and a negative direction along the Z-axis. By a user manually rotating gears in the lift mechanism 12 according to the first embodiment, a position of the measurement tank 10 is changed along the Z-axis. However, the lift mechanism 12 may be a mechanism that moves the measurement tank 10 along the Z-axis by using a drive source, such as a motor.

When the measurement tank 10 is moved in the positive direction along the Z-axis by the lift mechanism 12, the liquid surface at the measurement tank 10 approaches the light receiving element 31. When the measurement tank 10 is moved in the negative direction along the Z-axis by the lift mechanism 12, the liquid surface at the measurement tank 10 moves away from the light receiving element 31. The lift mechanism 12 is capable of moving the measurement tank 10 along the Z-axis at 0.5-mm intervals, for example.

Figure 2:
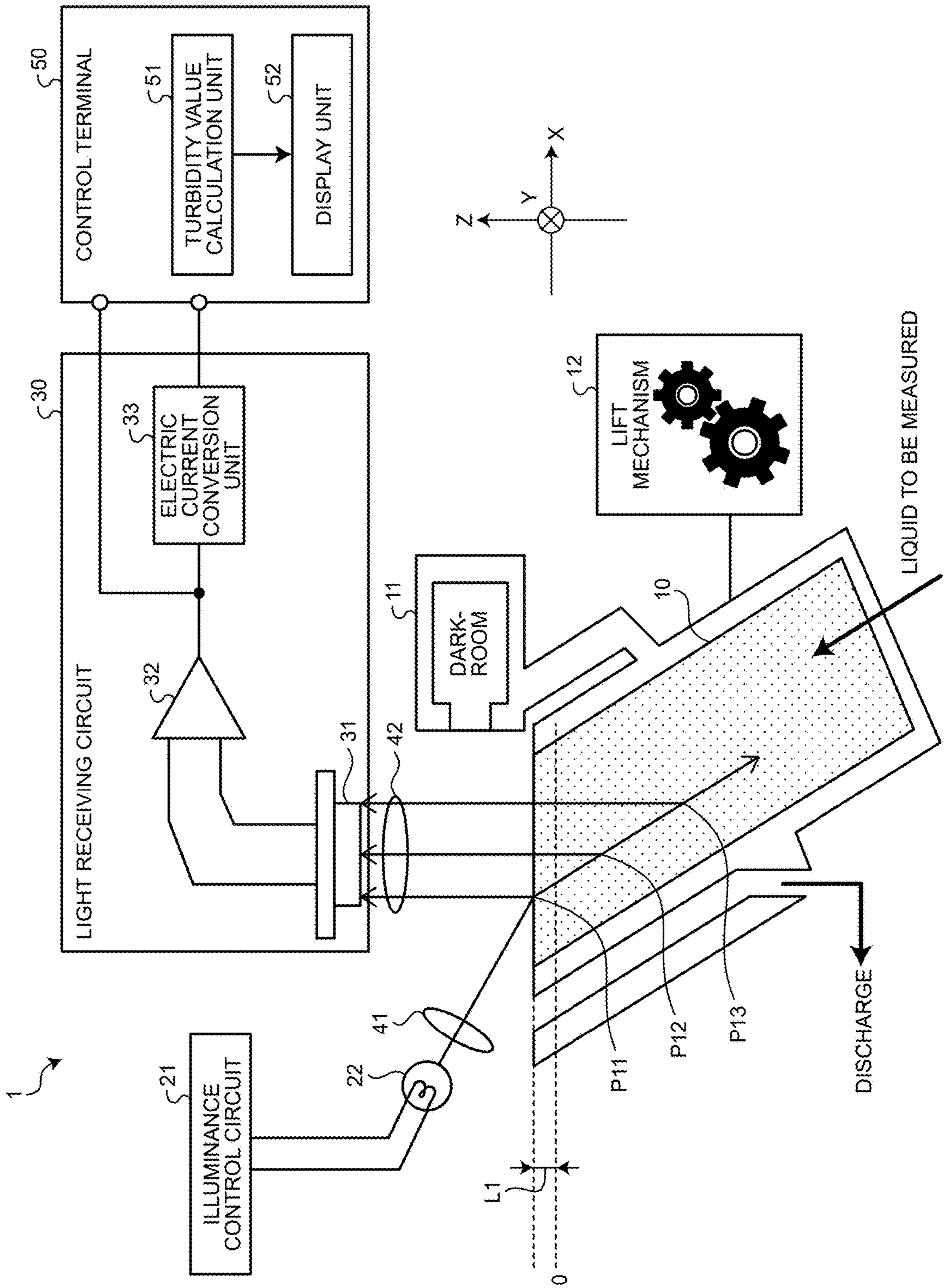
FIG. 2 is a diagram illustrating scattered light in a case where a liquid surface is brought closer to a light receiving element.

FIG. 2 is a diagram illustrating scattered light in a case where a liquid surface is brought closer to a light receiving element. FIG. 2 illustrates a state where the measurement tank 10 has been moved by a distance L1 in the positive direction along the Z-axis from the reference state by use of the lift mechanism 12. That is, in FIG. 2, the liquid surface has moved closer to the light receiving element 31 from the reference state by the distance L1.

In this case, an intersection point between emitted light and the liquid surface is at a position P11 moved in a negative direction along the X-axis from the position P1, the intersection point being at an irradiation position on the liquid surface, the irradiation position being where the light emitted from the light source 22 is emitted to. Therefore, as illustrated in FIG. 2, scattered light generated at a position deeper than the position P2 enters the light receiving element 31, the position P2 being the deepest point where scattered light is generated in the reference state. Specifically, a position P12 is a location that coincides, along the Z-axis, with the center of the light receiving element 31, and the deepest point where scattered light that enters the light receiving element 31 is generated is at a position P13. In other words, scattered light beams resulting from light beams having longer optical paths in the liquid than those in the reference state enter the light receiving element 31. In this case, because there are more positions where scattered light included in the range visible from the light receiving element 31 is generated than those in the reference state, scattered light at a larger number of positions in the liquid enters the light receiving element 31, and quantity of measured light is larger than that in the reference state.

Figure 3:
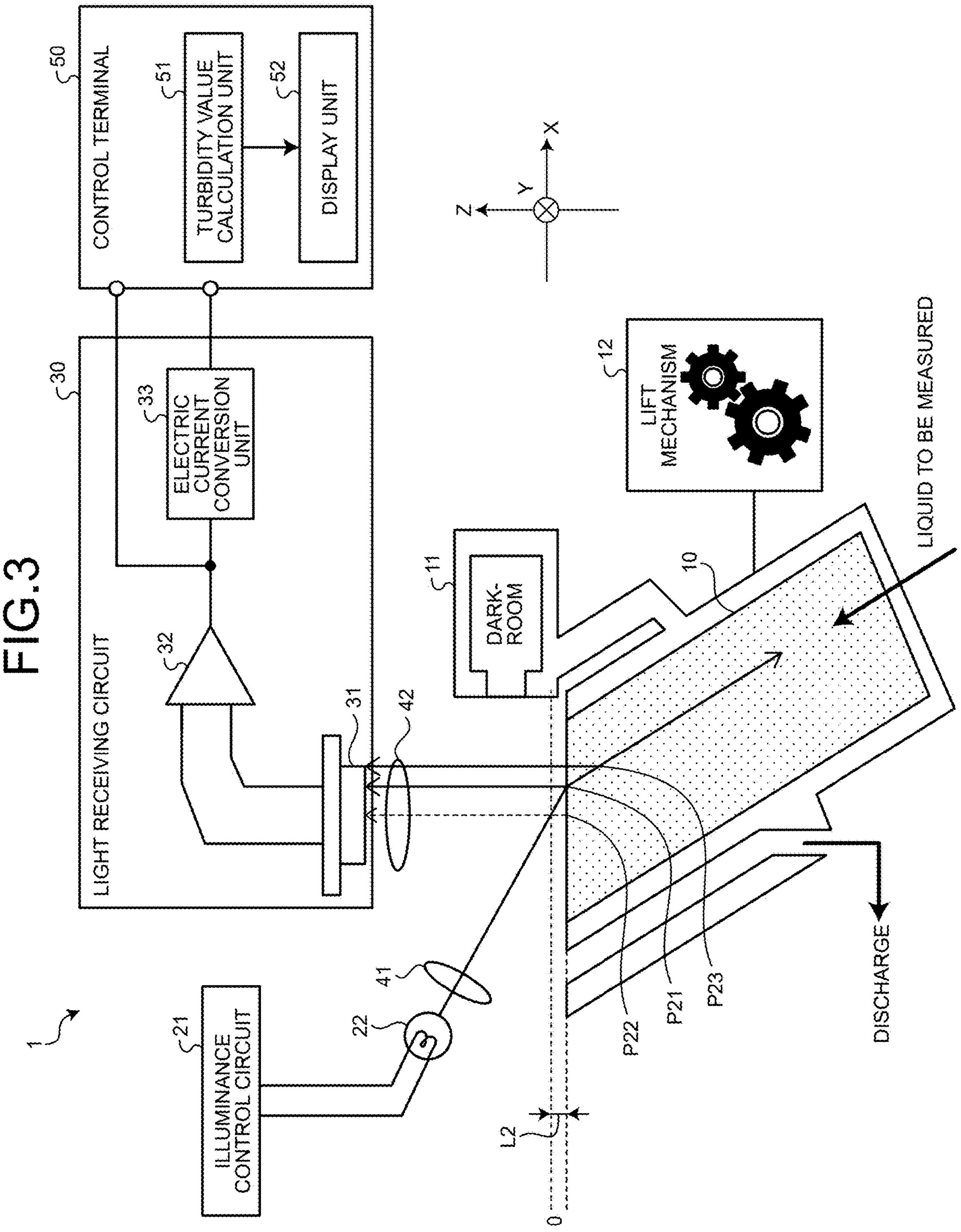
FIG. 3 is a diagram illustrating scattered light in a case where the liquid surface is distanced from the light receiving element.

FIG. 3 is a diagram illustrating scattered light in a case where the liquid surface is distanced from the light receiving element. FIG. 3 illustrates a state where the measurement tank 10 has been moved by a distance L2 in the negative direction along the Z-axis from the reference state by use of the lift mechanism 12. That is, in FIG. 3, the liquid surface has moved away from the light receiving element 31 from the reference state by the distance L2.

In this case, an intersection point between light emitted from the light source 22 and the liquid surface is at a position P21 moved in the positive direction along the X-axis from the position P1. In this case, a position P22 is a location that coincides with the center of the light receiving element 31 in the Z direction and the deepest point where scattered light in the range visible from the light receiving element 31 is generated is at a position P23. In other words, the longest value of optical path length in the liquid, the optical path length being that of scattered light that enters the light receiving element 31, is shorter than that in the reference state. In this case, because there are less positions where scattered light included in the range visible from the light receiving element 31 is generated than those in the reference state, scattered light enters the light receiving element 31 at fewer positions and quantity of measured light is smaller than that in the reference state.

The lift mechanism 12 is an example of a "change mechanism". The lift mechanism 12 changes a relative position between the light receiving element 31 and an irradiation position on a liquid surface, the irradiation position being where light from the light source 22 is emitted to, the relative position being in relation to a component horizontal to the liquid surface in the direction of travel of the light (that is, in relation to the X-axis). In other words, the lift mechanism 12 changes a position along the X-axis of an intersection point (the irradiation position) between the light from the light source 22 and the liquid surface. More specifically, the lift mechanism 12 is a mechanism that changes the above described relative position by changing the distance between the measurement tank 10 and the light receiving element 31 and in particular, changes the distance between the measurement tank 10 and the light receiving element 31 by moving the measurement tank 10.

The control terminal 50 calculates a turbidity value from an electric current signal indicating intensity of scattered light and displays the turbidity value. The control terminal 50 has a turbidity value calculation unit 51 and a display unit 52. The control terminal 50 corresponds to an example of a "turbidity value calculation device".

The turbidity value calculation unit 51 receives input of an electric current signal indicating intensity of scattered light, from the electric current conversion unit 33. The turbidity value calculation unit 51 has Equation (1) with a constant K set according to a liquid to be measured. The turbidity value calculation unit 51 calculates a turbidity value of the liquid to be measured by using the obtained electric current signal indicating the intensity of the scattered light and Equation (1). The turbidity value calculation unit 51 then outputs the calculated turbidity value of the liquid to be measured, to the display unit 52. The turbidity value calculation unit 51 thus calculates a turbidity value of a liquid to be measured on the basis of scattered light received by the light receiving element 31.

The display unit 52 receives input of the turbidity value of the liquid to be measured, from the turbidity value calculation unit 51. The display unit 52 then provides information to a user by causing, for example, a display to display the obtained turbidity value of the liquid to be measured.

Relation Between: Linearity; and Intersection Point Between Light Emitted from Light Source and Liquid Surface Intensity of scattered light in the measurement tank 10 has a relation expressed by Equation (1) below. In Equation (1), K is the constant, S is turbidity, Q is a quantity of light from the light source, and L is the intensity of the scattered light.

$$L = K \times Q \times S \tag{1}$$

Accordingly, the intensity L of the scattered light is dependent on the quantity Q of light from the light source and the turbidity S. Therefore, if the quantity Q of light from the light source is constant, the turbidity S is theoretically proportional to the intensity L of the scattered light. How much this relation between the turbidity S and the intensity L of the scattered light is close to being linear (having a proportional relation) will be referred to as linearity. That is, the closer the relation between the turbidity S and the intensity L of the scattered light is to being linear (having a proportional relation), the higher the linearity is, and the farther the relation is from being linear, the lower the linearity is. Because the turbidimeter 1 finds the turbidity S using Equation (1) by measuring the intensity L of the scattered light, the smaller the change in the linearity, the higher the precision of estimation of the turbidity S using Equation (1).

In the surface scatter turbidimeter 1, the tendency of the linearity is changed by a minute positional shift of the intersection point between the light emitted from the light source 22 and the liquid surface. Specifically, in a case where the position of the intersection point between the light emitted from the light source 22 and the liquid surface is shifted along the X-axis, the change in the linearity is large. By contrast, in a case where the position of the intersection point between the light emitted from the light source 22 and the liquid surface is shifted along the Y-axis, the quantity of scattered light detected is reduced, but the change in the linearity is small and its influence on calculation of turbidity stays within a permissible range. This is because in the case where the position of the intersection point is shifted along the X-axis, the path length in the water at the location where the scattered light is generated is largely changed and the linearity is thereby affected.

Furthermore, in a case where turbidity of a liquid to be measured is measured using scattered light, absorption of the scattered light by suspended matter occurs. Therefore, in a case where the liquid to be measured is high in turbidity, the scattered light is largely absorbed by the suspended matter. Being high in turbidity herein means that the turbidity is, for example, 250 nephelometric turbidity units (NTU) or more. By contrast, in a case where the liquid to be measured is low in turbidity, absorption of the scattered light by the suspended matter is little. Being low in turbidity herein means that the turbidity is, for example, 0 to 250 NTU.

Therefore, in a case where a liquid to be measured is high in turbidity, to minimize influence of absorption of scattered light by suspended matter, the optical path length in the liquid of light that generates the scattered light is preferably short. On the contrary, in a case where the liquid to be measured is low in turbidity, because influence of absorption of scattered light by suspended matter is little, the optical path length in the liquid of light that generates the scattered light may be long. The quantity of measured light is preferably large in both the case where the liquid to be measured is high in turbidity and the case where the liquid to be measured is low in turbidity.

In a case where the position of the intersection point between light emitted from the light source 22 and the liquid surface is shifted in the negative direction along the X-axis as illustrated in FIG. 2, with the position P1 serving as a reference, the position P1 being at the intersection point between light emitted from the light source 22 and the liquid surface in the reference state, the optical path length in the liquid in the range visible from the light receiving element 31 is extended from that in the reference state.

In a case where a liquid to be measured is high in concentration, extension of the optical path length in the liquid in the range visible from the light receiving element 31 leads to a reduction in the signal level due to the increased influence of absorption of scattered light by the suspended matter. Therefore, in the case where the liquid to be measured is high in concentration, the linearity is reduced.

On the contrary, in a case where a liquid to be measured is low in concentration, a shift of the position of the intersection point in the negative direction along the X-axis as illustrated in FIG. 2 leads to an increase in the quantity of measured light. Therefore, in the case where the liquid to be measured is low in concentration, the linearity is improved.

By contrast, in a case where the position of the intersection point between light emitted from the light source 22 and the liquid surface is shifted in the positive direction along the X-axis as illustrated in FIG. 3, with the position P1 serving as a reference, the position P1 being at the intersection point between light emitted from the light source 22 and the liquid surface in the reference state, the optical path length in the liquid in the range visible from the light receiving element 31 is shortened.

In a case where a liquid to be measured is high in concentration, a shorter optical path length in the liquid in the range visible from the light receiving element 31 reduces the influence of absorption of scattered light by the suspended matter and surface scatter dominates. Therefore, in the case where the liquid to be measured is high in concentration, the linearity is improved.

On the contrary, in a case where a liquid to be measured is low in concentration, a shift of the position of the intersection point in the positive direction along the X-axis as illustrated in FIG. 3 leads to a reduction in the quantity of measured light. Therefore, in the case where the liquid to be measured is low in concentration, the linearity is reduced.

FIG. 4 is a diagram illustrating a relation between height of a measurement tank and linearity. A table 101 in FIG. 4 summarizes a relation between height of the measurement tank 10 and the linearity. Specifically, as represented by the table 101, raising the height of the measurement tank 10 moves the intersection point between the optical axis and the liquid surface in the negative direction along the X-axis, and if the liquid to be measured is high in turbidity, the linearity is reduced, and if the liquid to be measured is low in turbidity, the linearity is improved. On the contrary, lowering the height of the measurement tank 10 moves the intersection point between the optical axis and the liquid surface in the positive direction along the X-axis, and if the liquid to be measured is high in turbidity, the linearity is improved, and if the liquid to be measured is low in turbidity, the linearity is reduced.

In view of the above, in a case where a liquid to be measured has turbidity equal to or higher than a high turbidity threshold that has been determined beforehand, the Z-coordinate of the measurement tank 10 is preferably moved in the negative direction from the reference state. On the contrary, in a case where a liquid to be measured has turbidity less than a low turbidity threshold that has been determined beforehand and that is equal to or less than the high turbidity threshold, the Z-coordinate of the measurement tank 10 is preferably moved in the positive direction from the reference state.

Turbidity Measurement Through Height Adjustment of Measurement Tank

The following description is on turbidity measurement through height adjustment of the measurement tank 10. The measurement tank 10 has been set to the height in the reference state in FIG. 1 at a start of turbidity measurement. A user then causes the turbidimeter 1 to calculate a turbidity value of a liquid to be measured in the reference state and causes the display unit 52 to display the turbidity value.

Subsequently, the user refers to the display unit 52 to check the turbidity value of the liquid to be measured in the reference state. This turbidity value of the liquid to be measured in the reference state measured first is referred to herein as the "turbidity value from a provisional measurement". The user then determines whether or not the turbidity value from the provisional measurement is equal to or larger than the high turbidity threshold, and whether or not the turbidity value from the provisional measurement is less than the low turbidity threshold.

In a case where the turbidity value from the provisional measurement is equal to or larger than the high turbidity threshold, the user moves the measurement tank 10 in the negative direction along the Z-axis to a high turbidity measurement position that has been determined beforehand, by using the lift mechanism 12. Thereafter, the user causes the turbidimeter 1 to calculate a turbidity value of the liquid to be measured in a state where the measurement tank 10 has been moved to the high turbidity measurement position and causes the display unit 52 to display the turbidity value calculated. The user then regards the provided turbidity value of the liquid to be measured as an actual turbidity value of the liquid to be measured.

By contrast, in a case where the turbidity value from the provisional measurement is less than the low turbidity threshold, the user moves the measurement tank 10 in the positive direction along the Z-axis to a low turbidity measurement position that has been determined beforehand, by using the lift mechanism 12. Thereafter, the user causes the turbidimeter 1 to calculate a turbidity value of the liquid to be measured in a state where the measurement tank 10 has been moved to the low turbidity measurement position and causes the display unit 52 to display the turbidity value calculated. The user then regards the provided turbidity value of the liquid to be measured as an actual turbidity value of the liquid to be measured.

In a case where the turbidity value from the provisional measurement is equal to or larger than the low turbidity threshold and less than the high turbidity threshold, the user can regard the turbidity value from the provisional measurement as an actual turbidity value of the liquid to be measured.

The low turbidity threshold and the high turbidity threshold may be identical turbidity values. In that case, the user compares one of the turbidity thresholds and the turbidity value from the provisional measurement to each other and determines a position of the measurement tank 10. In this case, the user does not necessarily regard the turbidity value from the provisional measurement measured at the position of the measurement tank 10 in the reference state as an actual turbidity value of the liquid to be measured.

The turbidimeter 1 according to the first embodiment changes, along the X-axis, the position of the intersection point between the optical axis and the liquid surface by changing the position of the measurement tank 10 along the Z-axis. However, the turbidimeter 1 may use any other mechanism that enables the relative position to be changed between the high turbidity case and the low turbidity case, the relative position being between the light receiving element 31 and the irradiation position on the liquid surface, the irradiation position being where light from the light source 22 is emitted to, the relative position being in relation to the component horizontal to the liquid surface in the direction of travel of the light.

For example, the turbidimeter 1 may change the position of the intersection point between the light from the light source 22 and the liquid surface along the X-axis by changing the direction of the optical axis of the light source 22. In this case, the turbidimeter 1 has a change mechanism that changes the relative position by changing the direction of the optical axis of light from the light source 22.

The turbidimeter 1 may change the position of the intersection point between the optical axis and the liquid surface along the X-axis by moving the light source 22 along at least one of the Z-axis and the X-axis. In this case, the turbidimeter 1 has a change mechanism that changes the relative position by changing the position of the light source 22.

In addition, the turbidimeter 1 may move the light receiving element 31 along the X-axis. In this case, the turbidimeter 1 has a change mechanism that moves the light receiving element 31 to change the relative position and to change the distance between the measurement tank 10 and the light receiving element 31.

As described above, the turbidimeter 1 according to the first embodiment enables the position of the intersection point to be changed, the intersection point being between the optical axis of light emitted from a light source 20 and the liquid surface. Scattered light is thereby able to be obtained from light emitted in a case where a liquid to be measured is high in turbidity and in a case where a liquid to be measured is low in turbidity, the scattered light being at an appropriate optical path length in the liquid, and linearity is thus able to be improved in both the high turbidity case and the low turbidity case. Therefore, precision of turbidity measurement is able to be improved.

Modified Example

In the first embodiment, the position of the measurement tank 10 is determined by use of one high turbidity threshold and one low turbidity threshold. However, the position may be changed stepwise according to turbidity in both a case where a liquid to be measured is high in turbidity and a case where a liquid to be measured is low in turbidity.

FIG. 5 is a diagram illustrating correspondence between plural turbidity thresholds and positions along the Z-axis. For example, a user has a table 200 illustrated in FIG. 5. In the table 200, the turbidity value decreases upward in FIG. 5 as viewed in a direction toward the plane of paper. A turbidity threshold corresponding to the reference position does not need to be set and has thus been excluded from the table 200.

Threshold values #1 to #3 in FIG. 5 are lower turbidity thresholds. Lower turbidity values are, for example, turbidity values equal to or smaller than 250 NTU. The turbidity thresholds #3 to #1 that are thresholds have been respectively associated with Z(1) to Z(3) that are positions of the measurement tank 10 in the positive direction along the Z-axis. For example, Z(1) to Z(3) have few-millimeter intervals therebetween and represent higher positions along the Z-axis in this order. The turbidity threshold #3 may be set as a low turbidity threshold according to the first embodiment. In this case, the measurement tank 10 is moved stepwise according to the turbidity value less than the low turbidity threshold.

The turbidity thresholds ##1 to ##3 are higher turbidity thresholds. Higher turbidity values are, for example, turbidity values equal to or larger than 250 NTU. The turbidity thresholds ##1 to ##3 that are thresholds have been respectively associated with Z(−1) to Z(−3) that are positions of the measurement tank 10 in the negative direction along the Z-axis. For example, Z(−1) to Z(−3) have few-millimeter intervals therebetween and represent lower positions along the Z-axis in this order. The reference position in the table 200 is the position of the measurement tank 10 along the Z-axis in the reference state illustrated in FIG. 1. The turbidity threshold ##1 may be set as a high turbidity threshold according to the first embodiment. In this case, the measurement tank 10 is moved stepwise according to the turbidity value equal to or larger than the high turbidity threshold.

The user checks a turbidity value resulting from a provisional measurement, measured in the reference state and displayed on the display unit 52. The user then compares the provisional turbidity value to the turbidity thresholds #1 to #3 and ##1 to ##3.

In a case where the turbidity value from the provisional measurement is equal to or larger than the turbidity threshold #2 and less than the turbidity threshold #3, the user recognizes that Z(1) corresponds as the Z-coordinate of the measurement tank 10 to the turbidity value by referring to the table 200. The user then operates the lift mechanism 12 to move the measurement tank 10 from the reference position in the positive direction along the Z-axis to the Z-coordinate, Z(1). In a case where the turbidity value from the provisional measurement is equal to or larger than the turbidity threshold #1 and less than the turbidity threshold #2, the user recognizes that Z(2) corresponds as the Z-coordinate of the measurement tank 10 to the turbidity value by referring to the table 200. The user then operates the lift mechanism 12 to move the measurement tank 10 from the reference position in the positive direction along the Z-axis to the Z-coordinate, Z(2). In a case where the turbidity value from the provisional measurement is less than the turbidity threshold #1, the user recognizes that Z(3) corresponds as the Z-coordinate of the measurement tank 10 to the turbidity value by referring to the table 200. The user then operates the lift mechanism 12 to move the measurement tank 10 from the reference position in the positive direction along the Z-axis to the Z-coordinate, Z(3).

In a case where the turbidity value from the provisional measurement is equal to or larger than the turbidity threshold ##1 and less than the turbidity threshold ##2, the user recognizes that Z(−1) corresponds as the Z-coordinate of the measurement tank 10 to the turbidity value by referring to the table 200. The user then operates the lift mechanism 12 to move the measurement tank 10 from the reference position in the negative direction along the Z-axis to the Z-coordinate, Z(−1). In a case where the turbidity value from the provisional measurement is equal to or larger than the turbidity threshold ##2 and less than the turbidity threshold ##3, the user recognizes that Z(−2) corresponds as the Z-coordinate of the measurement tank 10 to the turbidity value by referring to the table 200. The user then operates the lift mechanism 12 to move the measurement tank 10 from the reference position in the negative direction along the Z-axis to the Z-coordinate, Z(−2). In a case where the turbidity value from the provisional measurement is equal to or larger than the turbidity threshold ##3, the user recognizes that Z(−3) corresponds as the Z-coordinate of the measurement tank 10 to the turbidity value by referring to the table 200. The user then operates the lift mechanism 12 to move the measurement tank 10 from the reference position in the negative direction along the Z-axis to the Z-coordinate, Z(−3).

After moving the measurement tank 10 along the Z-axis according to the turbidity value from the provisional measurement as described above, the user causes the turbidimeter 1 to perform measurement of the liquid to be measured and calculate a turbidity value. The user then regards the calculated turbidity value as an actual turbidity value of the liquid to be measured.

As described above, the turbidimeter 1 according to the modified example enables the position of the measurement tank 10 along the Z-axis to be adjusted stepwise according to the turbidity value. Scattered light is thereby able to be obtained from light emitted according to the state of the liquid to be measured more finely, the scattered light being at an appropriate optical path length in the liquid, and linearity is thus able to be improved even more. Therefore, precision of turbidity measurement is able to be improved.

Second Embodiment

Figure 6:
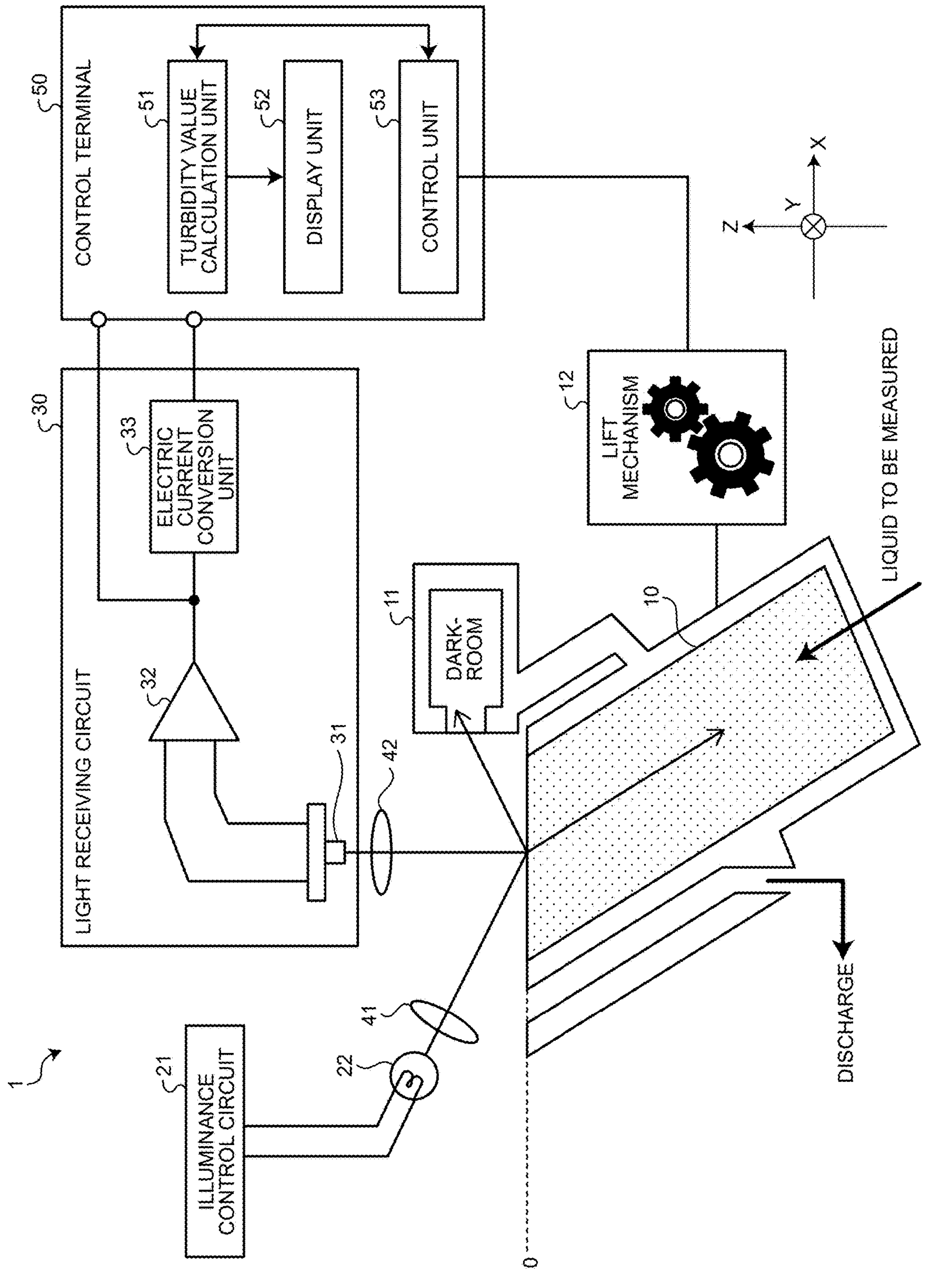
FIG. 6 is a diagram of a configuration of a turbidimeter according to a second embodiment.

FIG. 6 is a diagram of a configuration of a turbidimeter according to a second embodiment. A turbidimeter 1 according to the second embodiment automatically adjusts a position of a measurement tank 10 along a Z-axis according to a turbidity value measured in a provisional measurement. Each unit in FIG. 6 and having a reference sign that is the same as that in FIG. 1 has functions similar to the functions according to the first embodiment. The description hereinafter will mainly be on the automatic adjustment of the position of the measurement tank 10 along the Z-axis and description of operation of each unit similar to that according to the first embodiment may be omitted.

A control terminal 50 of the turbidimeter 1 according to the second embodiment further has a control unit 53, as illustrated in FIG. 6.

The measurement tank 10 has been set to the height in the reference state in FIG. 1 at a start of turbidity measurement. A turbidity value calculation unit 51 calculates a turbidity value from a provisional measurement by using scattered light at the measurement tank 10 in the reference state. Subsequently, the turbidity value calculation unit 51 receives input of an electric current signal indicating intensity of scattered light and calculates a turbidity value again, after the measurement tank 10 has been moved along the Z-axis according to the turbidity value from the provisional measurement by the control unit 53. The turbidity value calculation unit 51 then outputs the recalculated turbidity value of the liquid to be measured to a display unit 52 to cause the remeasured turbidity value of the liquid to be measured to be displayed on a display, for example.

In a case where the turbidity value calculation unit 51 has received a notification of a turbidity value determination from the control unit 53, the turbidity value calculation unit 51 outputs the turbidity value from the provisional measurement to the display unit 52 to cause the turbidity value from the provisional measurement to be displayed on the display, for example, the turbidity value serving as a turbidity value of the liquid to be measured.

The turbidity value from the provisional measurement herein is an example of a “first turbidity value”. The turbidity value measured by the turbidity value calculation unit 51 after the movement of the measurement tank 10 according to the turbidity value from the provisional measurement herein is an example of a “second turbidity value”. The turbidity value calculation unit 51 calculates a first turbidity value of a liquid to be measured at a predetermined position of the measurement tank 10 and calculates a second turbidity value of the liquid to be measured in a state where the measurement tank 10 has been moved from the predetermined position.

The control unit 53 has a communication route between the control unit 53 and a lift mechanism 12 and changes the position of the measurement tank 10 along the Z-axis by transmitting a command signal through the communication route to drive the lift mechanism 12. The control unit 53 also has, for example, the table 200 illustrated in FIG. 5 and having the turbidity thresholds and the positions of the measurement tank 10 along the Z-axis in association with each other.

The control unit 53 obtains the turbidity value from the provisional measurement from the turbidity value calculation unit 51. Subsequently, the control unit 53 compares the turbidity value from the provisional measurement to the turbidity thresholds #1 to #3 and ##1 to ##3 that are the thresholds that have been registered in the table 200.

In a case where the turbidity value from the provisional measurement is equal to or larger than the turbidity threshold #2 and less than the turbidity threshold #3, the control unit 53 drives the lift mechanism 12 to move the measurement tank 10 from a reference position in a positive direction along the Z-axis to the Z-coordinate, Z(1). In a case where the turbidity value from the provisional measurement is equal to or larger than the turbidity threshold #1 and less than the turbidity threshold #2, the control unit 53 drives the lift mechanism 12 to move the measurement tank 10 from the reference position in the positive direction along the Z-axis to the Z-coordinate, Z(2). In a case where the turbidity value from the provisional measurement is less than the turbidity threshold #1, the control unit 53 drives the lift mechanism 12 to move the measurement tank 10 from the reference position in the positive direction along the Z-axis to the Z-coordinate, Z(3).

In a case where the turbidity value from the provisional measurement is equal to or larger than the turbidity threshold ##1 and less than the turbidity threshold ##2, the control unit 53 drives the lift mechanism 12 to move the measurement tank 10 from the reference position in a negative direction along the Z-axis to the Z-coordinate, Z(−1). In a case where the turbidity value from the provisional measurement is equal to or larger than the turbidity threshold ##2 and less than the turbidity threshold ##3, the control unit 53 drives the lift mechanism 12 to move the measurement tank 10 from the reference position in the negative direction along the Z-axis to the Z-coordinate, Z(−2). In a case where the turbidity value from the provisional measurement is equal to or larger than the turbidity threshold ##3, the control unit 53 drives the lift mechanism 12 to move the measurement tank 10 from the reference position in the negative direction along the Z-axis to the Z-coordinate, Z(−3).

In a case where the turbidity value from the provisional measurement is equal to or larger than the turbidity threshold #3 and less than the turbidity threshold ##1, the control unit 53 notifies the turbidity value calculation unit 51 of a turbidity value determination of an actual turbidity value that is the turbidity value from the provisional measurement.

The control unit 53 thus causes the lift mechanism 12 that is a change mechanism to move the measurement tank 10 from a predetermined position on the basis of a first turbidity value. The turbidity threshold #1 may be set as a low turbidity threshold and the turbidity threshold ##1 may be set as a high turbidity threshold. That is, in a case where the first turbidity value is equal to or larger than the predetermined high turbidity threshold, the control unit 53 moves the measurement tank 10 stepwise in a direction away from a light receiving element 31 according to the first turbidity value. Furthermore, in a case where the first turbidity value is less than the low turbidity threshold, the control unit 53 moves the measurement tank 10 stepwise in a direction toward the light receiving element 31 according to the first turbidity value.

A case where three or more turbidity thresholds are used has been described above, but the control unit 53 may adjust the position of the measurement tank 10 along the Z-axis by using a high turbidity threshold and a low turbidity threshold, similarly to the first embodiment. That is, in a case where the first turbidity value is equal to or larger than a predetermined high turbidity threshold, the control unit 53 may move the measurement tank 10 in the direction away from the light receiving element 31 and in a case where the first turbidity value is less than a low turbidity threshold equal to or less than the high turbidity threshold, the control unit 53 may move the measurement tank 10 in the direction toward the light receiving element 31.

The control unit 53 may use the same value as the high turbidity threshold and the low turbidity threshold. In this case, the control unit 53 determines the position of the measurement tank 10 along the Z-axis on the basis of whether or not the first turbidity value is equal to or larger than that one turbidity threshold.

Flow of Turbidity Value Calculation Process

Figure 7:
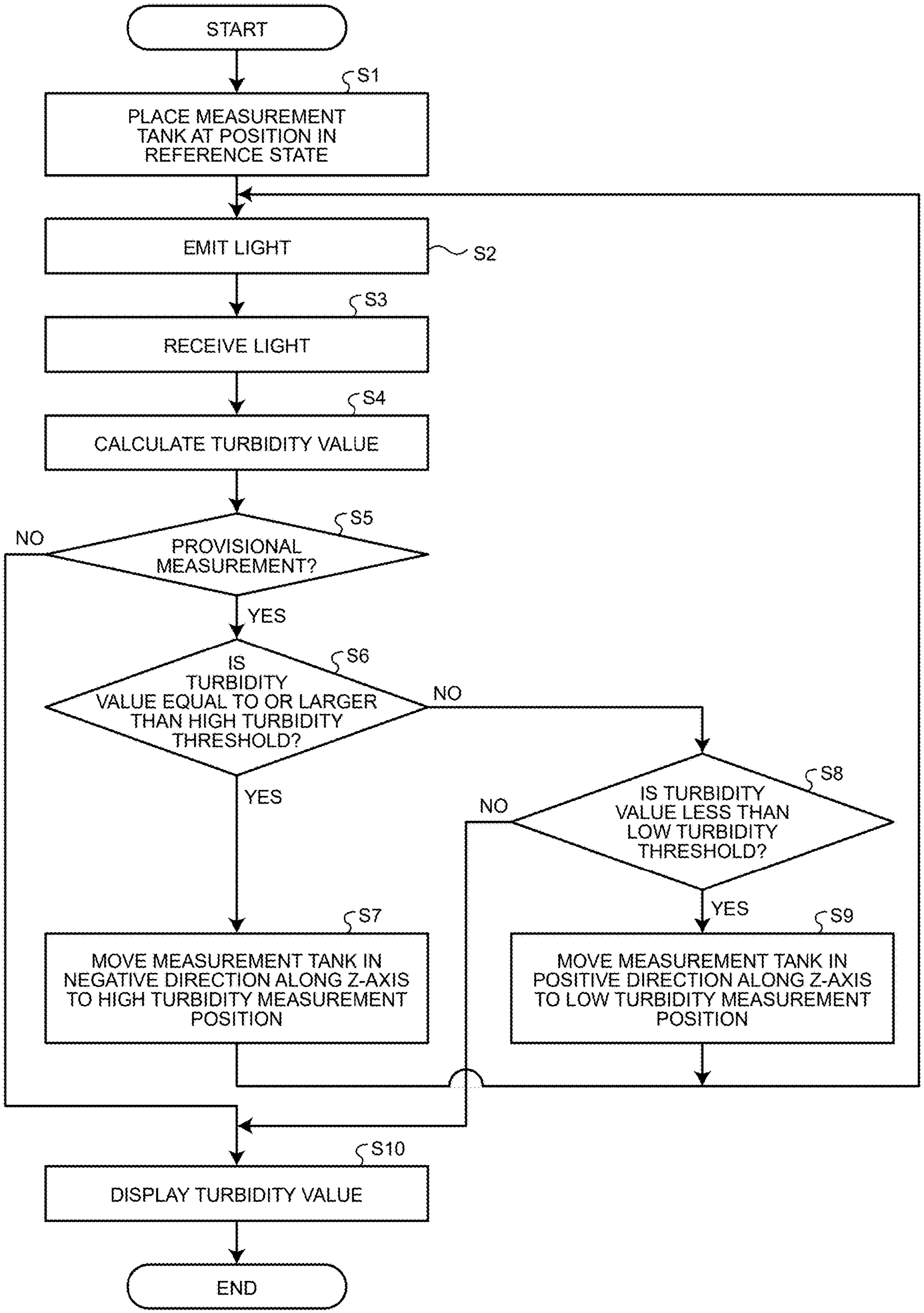
FIG. 7 is a flowchart of a turbidity value calculation process by the turbidimeter according to the second embodiment.

FIG. 7 is a flowchart of a turbidity value calculation process by the turbidimeter according to the second embodiment. FIG. 7 illustrates an example of the process in a case where a position of the measurement tank 10 along the Z-axis is adjusted by use of a high turbidity threshold and a low turbidity threshold. A flow of a turbidity value calculation process by the turbidimeter 1 according to the second embodiment will be described next by reference to FIG. 7.

The measurement tank 10 is placed at the position in the reference state (Step S1).

The light source 22 emits light to a liquid surface of a liquid to be measured stored in the measurement tank 10 via a lens 41 (Step S2).

The light receiving element 31 receives, via a lens 42, scattered light at the liquid surface and in the liquid, the scattered light being from the light emitted from the light source 22 (Step S3).

The light receiving element 31 detects the scattered light received. An amplifier 32 amplifies intensity of the scattered light. An electric current conversion unit 33 converts an optical signal of the scattered light into an electric current signal indicating the intensity of the scattered light and outputs the electric current signal to the control terminal 50. The turbidity value calculation unit 51 calculates a turbidity value of the liquid to be measured by using the electric current signal indicating the intensity of the scattered light (Step S4).

The turbidity value calculation unit 51 determines whether or not the measurement that has been executed is a provisional measurement (Step S5).

In a case where the measurement that has been executed is a provisional measurement (Step S5: Yes), the turbidity value calculation unit 51 outputs the turbidity value from the provisional measurement to the control unit 53. The control unit 53 determines whether or not the turbidity value from the provisional measurement is equal to or larger than a high turbidity threshold (Step S6).

In a case where the turbidity value from the provisional measurement is equal to or larger than the high turbidity threshold (Step S6: Yes), the control unit 53 moves the measurement tank 10 in the negative direction along the Z-axis by using the lift mechanism 12 to move the measurement tank 10 to a high turbidity measurement position (Step S7). Thereafter, the turbidity value calculation process is returned to Step S2.

By contrast, in a case where the turbidity value from the provisional measurement is less than the high turbidity threshold (Step S6: No), the control unit 53 determines whether or not the turbidity value from the provisional measurement is less than a low turbidity threshold (Step S8).

In a case where the turbidity value from the provisional measurement is less than the low turbidity threshold (Step S8: Yes), the control unit 53 moves the measurement tank 10 in the positive direction along the Z-axis by using the lift mechanism 12 to move the measurement tank 10 to a low turbidity measurement position (Step S9). Thereafter, the turbidity value calculation process is returned to Step S2.

On the contrary, in a case where the turbidity value from the provisional measurement is equal to or larger than the low turbidity threshold (Step S8: No), the control unit 53 notifies the turbidity value calculation unit 51 of a turbidity value determination. In a case where the turbidity value calculation unit 51 has been notified by the control unit 53 of the turbidity value determination or in a case where the measurement that has been executed is not a provisional measurement (Step S5: No), the turbidity value calculation unit 51 causes the display unit 52 to display the turbidity value calculated, as an actual turbidity value of the liquid to be measured (Step S10).

As described above, the turbidimeter 1 according to the second embodiment performs a provisional measurement of a turbidity value by using the measurement tank 10 in the reference state and automatically adjusts a position of the measurement tank 10 along the Z-axis according to a result of calculation of the turbidity value from the provisional measurement. The turbidimeter 1 then calculates a turbidity value again by using the measurement tank 10 at the position that has been adjusted and provides the turbidity value recalculated, as an actual turbidity value of the liquid to be measured, to a user.

The position of the measurement tank 10 along the Z-axis is thereby able to be automatically adjusted stepwise accurately according to the turbidity value without burdening the user with handwork. Scattered light is thereby able to be obtained from light emitted according to a state of the liquid to be measured automatically and more finely, the scattered light being at an appropriate optical path length in the liquid, and linearity is thus able to be improved even more. Therefore, precision of turbidity measurement is able to be improved, with less burdens on the user and less human errors.

As described above, in the second embodiment, the control unit 53 automatically adjusts a position of the measurement tank 10 along the Z-axis according to a turbidity value from a provisional measurement. However, in a case where the turbidimeter 1 has a change mechanism that changes the direction of the optical axis of the light source 22, the control unit 53 may control this change mechanism to automatically change the direction of the optical axis of the light source 22 according to a turbidity value from a provisional measurement. Or in a case where the turbidimeter 1 has a change mechanism that changes the position of the light source 22, the control unit 53 may control this change mechanism to automatically change the position of the light source 22 according to a turbidity value from a provisional measurement. Or in a case where the turbidimeter 1 has a change mechanism that changes the position of the light receiving element 31, the control unit 53 may control this change mechanism to automatically change the position of the light receiving element 31 according to a turbidity value from a provisional measurement.

System

The sequence of the process, the control sequence, the specific names, and the information including various data and parameters, which have been described above and illustrated in the drawings may be modified in any way unless particularly stated otherwise.

Furthermore, the components of each apparatus/device in the drawings have been illustrated functionally and/or conceptually, and do not need to be physically configured as illustrated in the drawings. That is, specific modes of separation and integration of each apparatus/device are not limited to those illustrated in the drawings. That is, all or part of each apparatus/device may be configured to be functionally or physically separated or integrated in any units according to various loads and use situations.

Furthermore, all or any part of the processing functions performed in each apparatus/device may be implemented by a central processing unit (CPU) and a program analyzed and executed by the CPU, or may be implemented as hardware by wired logic.

Hardware

Figure 8:
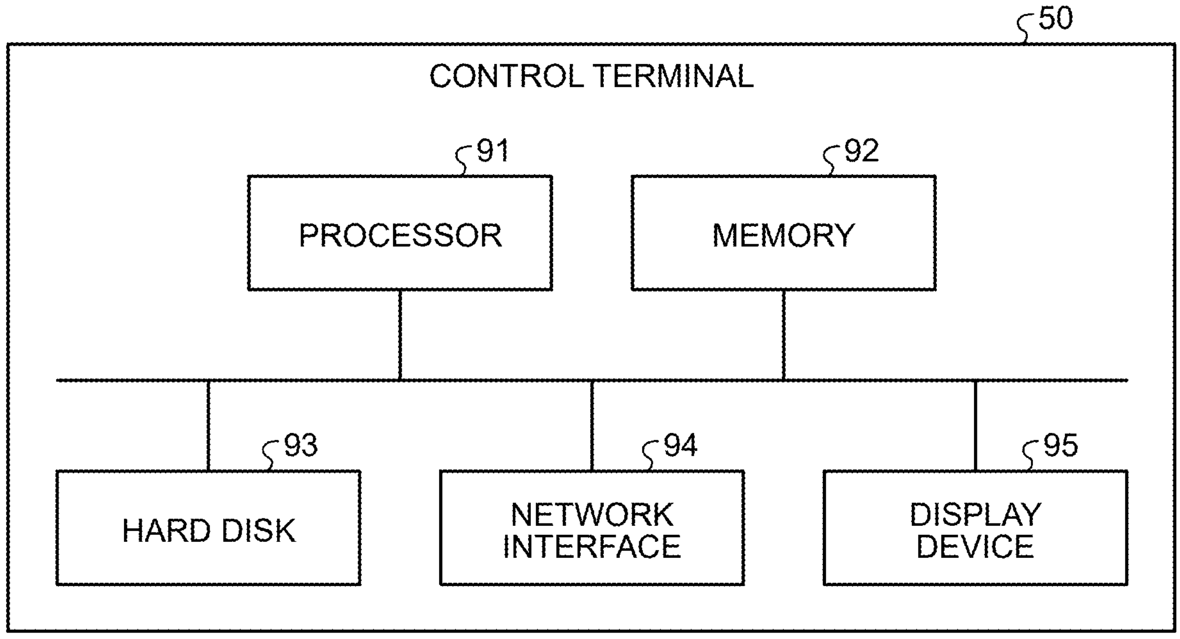
FIG. 8 is a diagram of a hardware configuration of a control terminal.

An example of a hardware configuration of the control terminal 50 will be described next. FIG. 8 is a diagram of a hardware configuration of a control terminal. As illustrated in FIG. 8, the control terminal 50 has a processor 91, a memory 92, a hard disk 93, a network interface 94, and a display device 95. The processor 91 is connected to the memory 92, the hard disk 93, the network interface 94, and the display device 95, via a bus.

The network interface 94 is, for example, a network interface card and is used in communication to and from another information processing device. The display device 95 is, for example, a monitor or a display, and implements functions of the display unit 52.

The hard disk 93 is an auxiliary storage device. The hard disk 93 may store, for example, the table 200 illustrated in FIG. 5. The hard disk 93 stores various programs including programs for implementing functions of the turbidity value calculation unit 51 and the control unit 53.

The processor 91 reads the various programs stored in the hard disk 93 and loads the read various programs into the memory 92 to execute the various programs. The processor 91 thereby implements the functions of the turbidity value calculation unit 51 and the control unit 53.

The control terminal 50 thus operates as an information processing device that executes various processing methods, by reading and executing the programs. Furthermore, the control terminal 50 may implement functions similar to those according to any of the above described embodiments by reading the programs from a recording medium by means of a medium reading device and executing the programs read. The programs referred to herein are not limited to being executed by the control terminal 50. For example, the present invention may be similarly applied to a case where another computer or a server executes the programs, or a case where the computer and the server execute the programs in corporation with each other.

These programs may be distributed via a network, such as the Internet. Furthermore, the programs may be executed by being recorded in a computer-readable recording medium, such as a hard disk, a flexible disk (FD), a CD-ROM, a magneto-optical (MO) disk, or a digital versatile disc (DVD), and being read from the recording medium by a computer.

The following are some examples of a combination of technical featured disclosed herein.

The present invention enables improvement of precision of turbidity measurement.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A surface scatter turbidimeter, comprising:

a measurement tank to store a liquid to be measured;

a light source that emits light to a liquid surface of the liquid to be measured stored in the measurement tank;

a light receiving element that receives scattered light generated at the measurement tank from the light from the light source;

a change mechanism that changes a relative position between an irradiation position that the light from the light source is emitted to on the liquid surface and the light receiving element, the relative position being in relation to a component horizontal to the liquid surface in a direction of travel of the light; and a turbidity value calculation unit that calculates a turbidity value of the liquid to be measured on the basis of the scattered light received by the light receiving element.

2. The surface scatter turbidimeter according to claim 1, wherein the change mechanism changes the relative position by changing a distance between the measurement tank and the light receiving element.

3. The surface scatter turbidimeter according to claim 2, wherein the change mechanism is a mechanism that changes the distance between the measurement tank and the light receiving element by moving the measurement tank.

4. The surface scatter turbidimeter according to claim 3, wherein the turbidity value calculation unit calculates a first turbidity value of the liquid to be measured for a case where the relative position is in a first state and a second turbidity value of the liquid to be measured for a case where the relative position is in a second state, and the surface scatter turbidimeter further comprises a control unit that controls the change mechanism so as to change, on the basis of the first turbidity value, the relative position from the first state to the second state.

5. The surface scatter turbidimeter according to claim 4, wherein in a case where the first turbidity value is equal to or larger than a high turbidity threshold, the control unit changes the relative position so as to decrease an optical path length of the light in the liquid to be measured by controlling the change mechanism, and in a case where the first turbidity value is less than a low turbidity threshold equal to or less than the high turbidity threshold, the control unit changes the relative position so as to increase the optical path length by controlling the change mechanism.

6. The surface scatter turbidimeter according to claim 5, wherein in the case where the first turbidity value is equal to or larger than the high turbidity threshold, the control unit changes the relative position so as to decrease the optical path length stepwise according to the first turbidity value by controlling the change mechanism, and in the case where the first turbidity value is less than the low turbidity threshold, the control unit changes the relative position so as to increase the optical path length stepwise according to the first turbidity value by controlling the change mechanism.

7. The surface scatter turbidimeter according to claim 2, wherein the change mechanism is a mechanism that changes the distance between the measurement tank and the light receiving element by moving the light receiving element.

8. The surface scatter turbidimeter according to claim 1, wherein the change mechanism changes the relative position by changing a direction of an optical axis of the light from the light source.

9. The surface scatter turbidimeter according to claim 1, wherein the change mechanism changes the relative position by changing a position of the light source.

10. A turbidity measurement method of using a surface scatter turbidimeter comprising: a measurement tank to store a liquid to be measured; a light source to emit light to a liquid surface of the liquid to be measured stored in the measurement tank; and a light receiving element that receives scattered light generated at the measurement tank from the light from the light source, the turbidity measurement method including:

causing a change mechanism to change a relative position between an irradiation position that the light from the light source is emitted to on the liquid surface and the light receiving element, the relative position being in relation to a component horizontal to the liquid surface in a direction of travel of the light; and causing a turbidity value calculation unit to calculate a turbidity value of the liquid to be measured on the basis of the scattered light received by the light receiving element.

* * * * *